Aug. 13, 1940.　　W. F. ZIMMERMANN　　2,211,309
POWER OPERATED SWIVEL CARRIAGE FOR HOBBING MACHINES
Filed July 11, 1939　　4 Sheets-Sheet 1

INVENTOR
William F. Zimmermann
BY
Albert F. Nathan
ATTORNEY

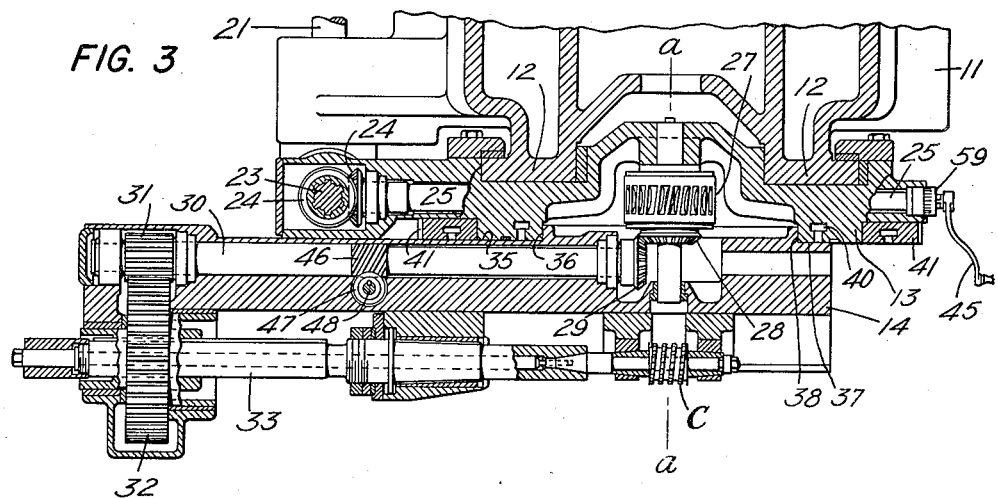
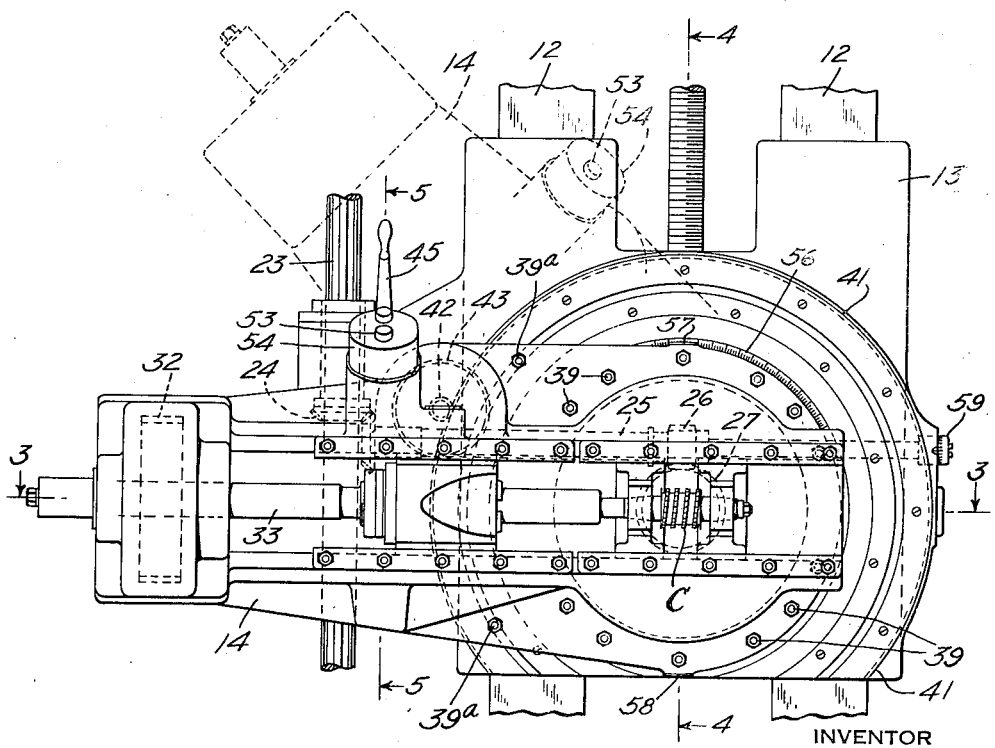

Aug. 13, 1940.   W. F. ZIMMERMANN   2,211,309
POWER OPERATED SWIVEL CARRIAGE FOR HOBBING MACHINES
Filed July 11, 1939   4 Sheets-Sheet 4

INVENTOR
William F. Zimmermann
BY
Albert F. Nathan
ATTORNEY

Patented Aug. 13, 1940

2,211,309

UNITED STATES PATENT OFFICE 2,211,309

POWER OPERATED SWIVEL CARRIAGE FOR HOBBING MACHINES

William F. Zimmermann, Maplewood, N. J., assignor to Gould & Eberhardt, Newark, N. J., a corporation of New Jersey Application July 11, 1939, Serial No. 283,727

9 Claims. (Cl. 90—3)

The present invention relates to machine tools and particularly to an improved adjusting mechanism for swiveling the cutter carriage of a hobbing machine.

The invention aims primarily to effect major adjustments in angular movement of a swivel carriage quickly and easily and in a manner such that the operator is relieved of substantially the entire burden of shifting relatively massive and heavy machine tool units by hand.

A further aim of the invention is to enable the operator to effect angular adjustments in the position of a swivel carriage selectively in either direction by hand or by power, and to include therein an arrangement whereby the power adjusting mechanism automatically throws itself out of action the moment the operator releases his grip on the power control to the end that the danger of inadvertently leaving the power mechanism in action is definitely eliminated.

A further object of the invention is to render available a compact power adjusting mechanism that may be built into a swivel cutter carriage and made a part thereof without severe re-arrangement or re-construction of the carriage elements or in the mounting thereof.

Still another object of the invention is to render available a mechanism for adjusting swivel carriages on a translatable slide in which the power for operating the carriage is derived from within the carriage itself, thereby to avoid the difficulties incident to the transmission of power to and between relatively movable members from an outside source.

The cutter slide of a gear hobbing machine herein illustrated exemplifies the need of a power adjuster of this character. In such machines the carriage is mounted upon a translatable slide and pivoted for movement about a horizontal axis so that the machine may be set up for cutting left or right hand helical gears. Normally, the cutter axis extends horizontally or is inclined from the horizontal, either up or down, as the angle of the teeth on the gear being cut, may prescribe. The drive to the cutter is through the axis of swivel, then at right angles to one extreme end of the carriage, and back to the hob which is at the axis of rotation. With such a construction, the swivel carriage is considerably overbalanced on one side, and this accordingly, favors manual adjustment in one direction but definitely opposes it in the other. In making an adjustment in angularity, to adapt the machine for cutting a helical gear of the opposite hand, the carriage must be swung from one side to the other through a substantial arc, and for at least half of that distance, the unbalanced weight of the carriage must be, with mechanisms heretofore employed, borne by the hand of the operator.

This invention among other features, undertakes to relieve the operator of that burden, and to provide a mechanism fool-proof in action whereby the power already in the carriage for propelling the cutter is made use of selectively, to propel the carriage angularly in either direction.

Still another aim of the invention is to enable the operator quickly and easily to adjust the angularity of the carriage with a high degree of precision, and to that end to provide at least two points whereat exceedingly fine adjustments may be made. One of those points of adjustment is preferably on the swivel carriage itself, which may be availed of when its position in space is favorable, and the other point of adjustment being located on a non-swiveling member, preferably the tool slide which does not change its angular position and which may, therefore, be availed of at any time to effect the necessary fine adjustment.

In attaining the objectives of the invention, it is proposed to utilize a structure similar in some respects to the structure disclosed in my prior Patent No. 2,073,917, dated Mar. 16, 1937, and operatively to combine and relate therewith the further mechanisms required to achieve the results above mentioned.

In my said prior patent a pair of bevel gears transmits power from the axis of rotation of the carriage laterally to a pair of gears situated at the extreme side, and thence back to the hobbing cutter at the center of the carriage. With the present invention, it is proposed to utilize the power for operating the cutter, and also to overcome the weight and mass of the carriage itself. That end is achieved by incorporating an improved carriage adjusting means in the cutter drive at a point thereof wholly within the swivel mounting, and so arranged that whenever the main drive is in operation, and irrespective of the angular position of the carriage on its slide, the carriage may be angularly adjusted by power.

Minor adjustments in angularity are effected by a detachable hand crank which may be operated from either of two points, one point being located in the branching power transmission in the swivel carriage, and the other point, which yields preferably still finer precision adjustments, being at a conveniently accessible portion of the main drive to the cutter and preferably between the aforementioned branch train and the main source of power. The location of the second point of manual adjustment in the non-revolvable cutter slide possesses the further advantage of additional reduction gearing with consequential increase in accuracy of adjustment per turn of the crank, non-movability of the actuating shaft in relation to the movements of the swivel member, and the further advantage that the angular position of the hobbing cutter as well as the position of the swivel carriage, may be carefully and accurately adjusted.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:

Fig. 2 is a front view of the swivel cutter carriage and its slide.

Fig. 3 is a horizontal sectional view along line 3—3 of Fig. 2.

Figure 5:
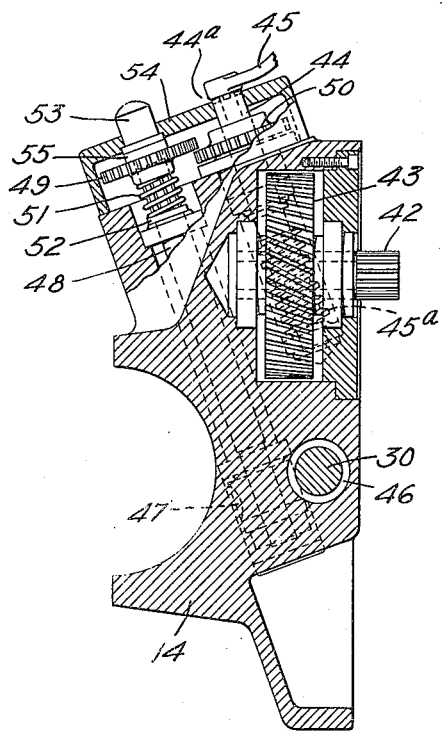
Figure 4:
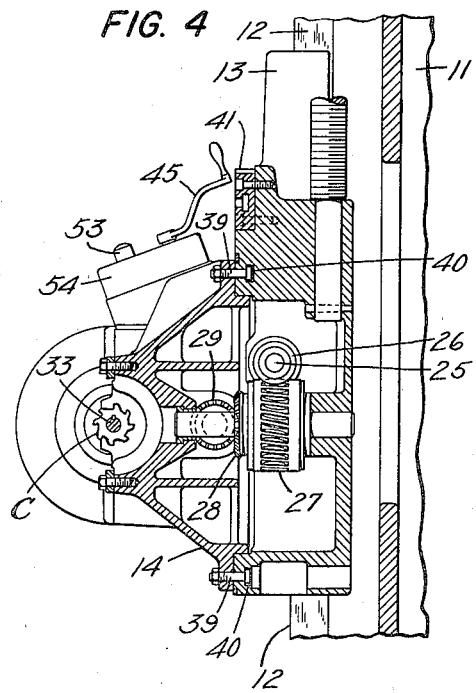

Figs. 4 and 5 are vertical sectional views through respectively lines 4—4 and 5—5 of Fig. 2.

Figure 6:
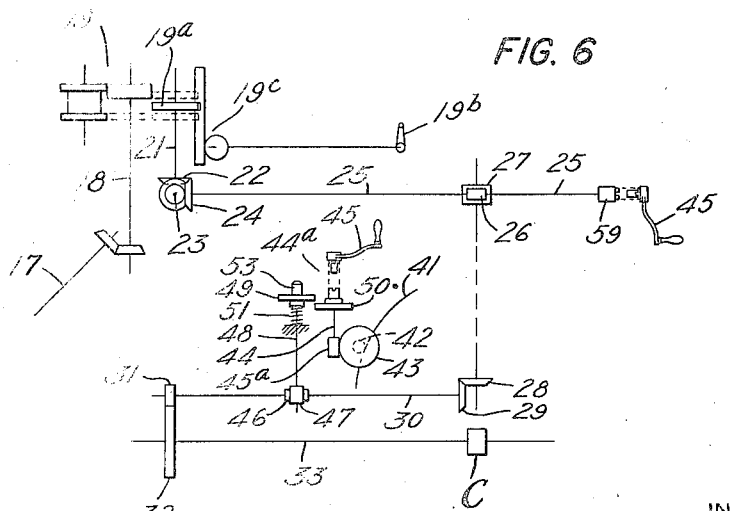

Fig. 6 is a line diagram of the portion of the cutter drive and carriage adjusting train.

Figure 7:
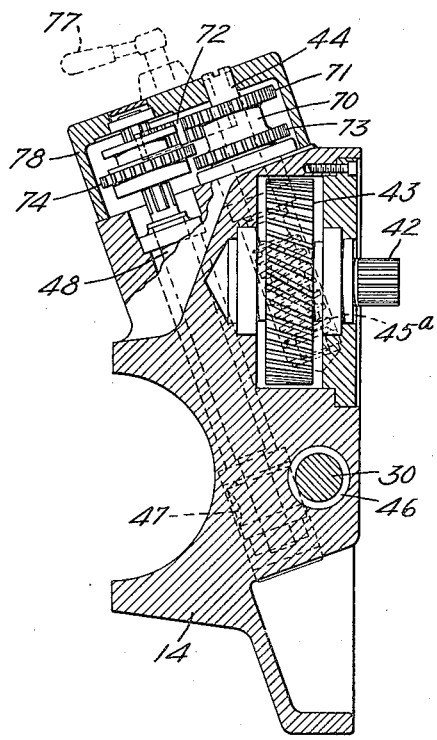

Fig. 7 is a vertical sectional view of a variant form of branch train embodying a reversing mechanism.

Figure 8:
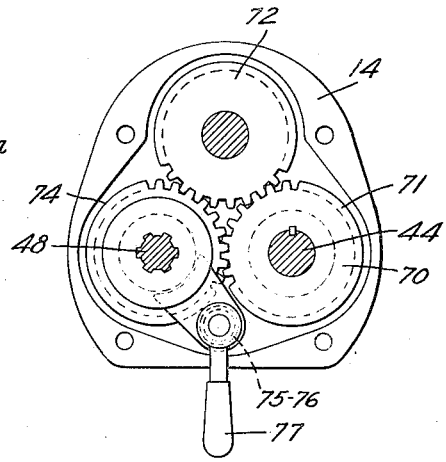

Fig. 8 is a plan view of the gearing of Fig. 7.

Figure 9:
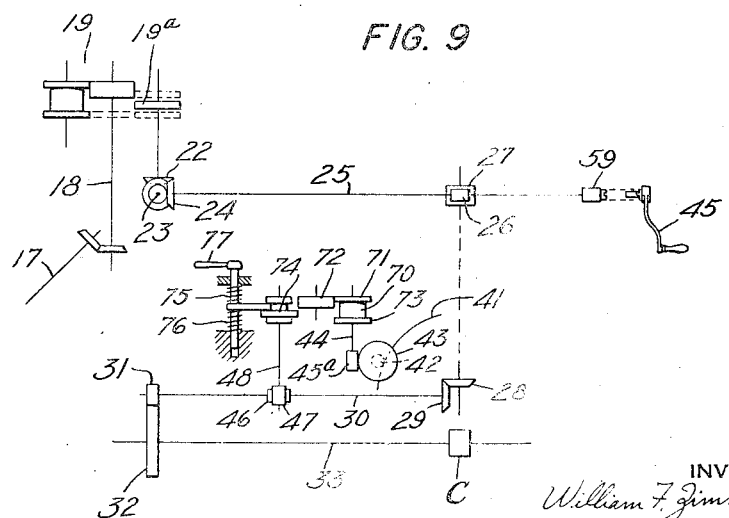

Fig. 9 is a line diagram of the drive of the arrangement disclosed in Figs. 7 and 8.

Figure 1:
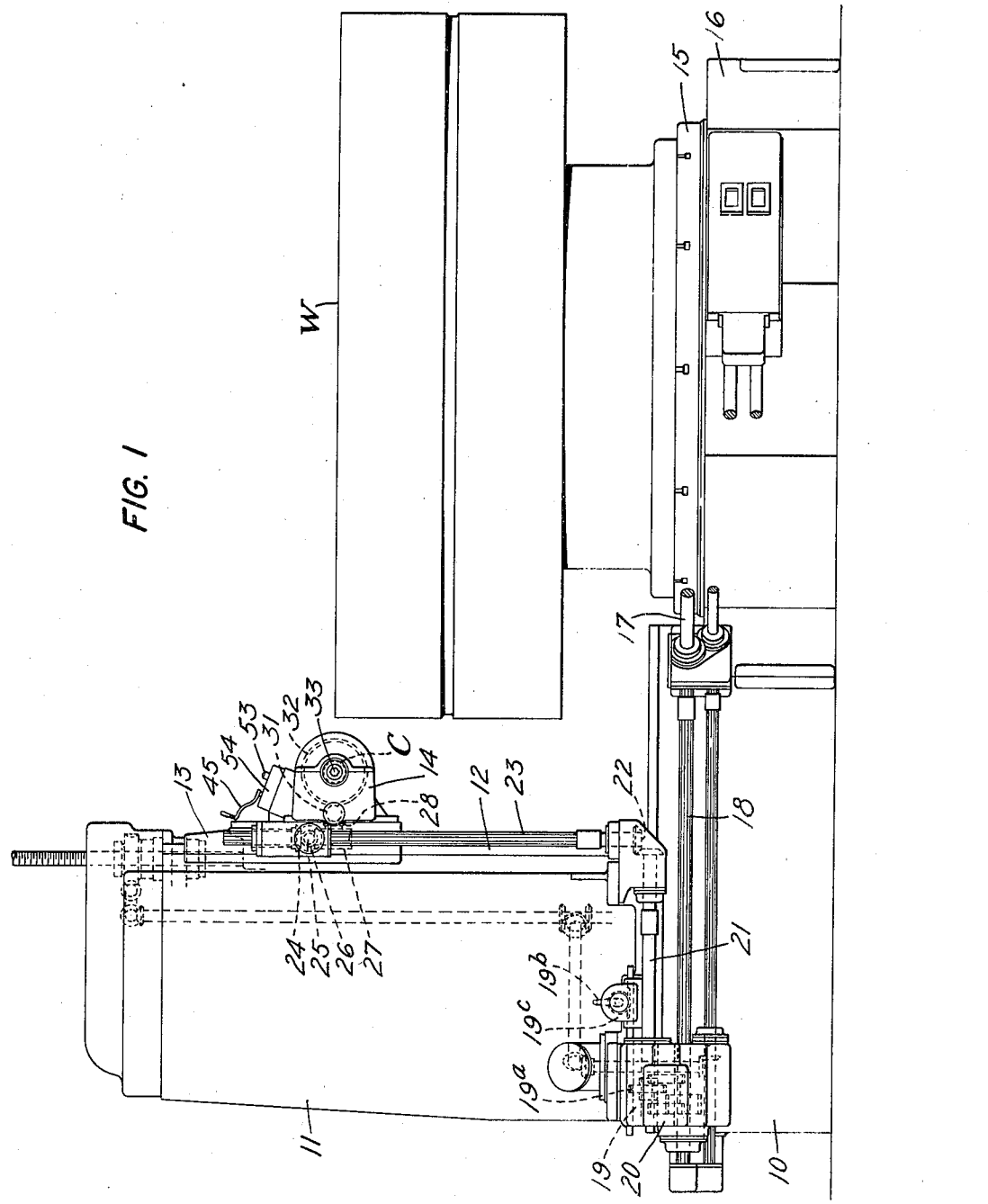
Figure 1 is an elevational view of a hobbing machine embodying the present invention.

Figure 1 is the drawings illustrates the partially assembled hobbing machine which comprises a base member 10 upon which there is mounted for adjustment toward or away from the workpiece W a cutter stanchion 11. The forward face of the stanchion is provided with vertically arranged guideways 12 upon which is mounted a vertically translatable tool slide 13. A swivel carriage 14 is pivotally mounted to the tool slide and provides the bearings and support for the hob C and its immediate drive train. The workpiece W is mounted upon a rotating work table 15 which in turn is journaled in a base 16 that may form a part of the stanchion base 10 or be a separate unit located and secured in fixed relation therewith.

The operating cycle of a machine of this character briefly is as follows: The operator mounts the work blank W on the carriage 14 and then advances the stanchion 11 toward the workpiece to a position such that when the cutter is translated along the slideways 12, the proper depth of tooth cut in the work plank will be attained. The swivel carriage is adjusted angularly on the slide 13 properly to relate the hob with the angle of teeth to be cut on the blank, and then clamped securely in position. The machine is then placed in operation, at which time, both the work blank and the hob are caused to revolve in timed relation and simultaneously the cutter carriage is fed slowly downwardly (from the position shown in Fig. 1) until the desired axial length of the teeth have been cut on the blank. The cutter carriage is then returned to its elevated position and the cycle is repeated on a new workpiece or repeated on the same workpiece with a "finishing" cutter.

Inasmuch as the mechanisms for propelling the work table and for attaining various rates and relations of movements of the cutter and table form no part of the present invention, such mechanisms have been eliminated from the disclosure in the interest of clarity, and only such portions of the cutter driving mechanism as are believed necessary for an understanding of the present invention, have been illustrated.

With reference to Figs. 1 and 6, the power for rotating the hobbing cutter enters the machine through shafts 17 and 18, thence through reversing gearing 19 journaled in the sliding gear box 20 to a stanchion journaled shaft 21. Bevel gears 22 transmit the power to a splined vertical shaft 23 translatably journaled in the cutter slide 13, where a second pair of bevel gears 24 transmits the power to a horizontal worm shaft 25 also journaled in the tool slide.

Intermediate the ends of the worm shaft 25, a worm gear 26 is provided which meshes with a worm wheel 27 mounted for rotation at the swivel axis of the angularly adjustable carriage 14. At the forward side of the worm wheel 27, a bevel gear 28 transmits the power through gear 29 to a shaft 30 which is journaled wholly in the swivel carriage element 14. The shaft 30 extends to the extreme left, as illustrated in Figs. 2 and 3 of the drawings, and carries a cutter driving pinion 31 which meshes constantly with a gear 32 splined to the adjustable cutter spindle 33. In this way the cutter is driven by power and by reason of the bevel gear connections 28 and 29, the swivel carriage may be revolved about the axis a—a and assume any angular position relative to the translatable slide 13 without any interruption in the cutter driving train.

Figs. 3 and 4 illustrate more clearly a preferred form of swivel mounting for the carriage 14 which consists in forming a relatively large flat bearing surface 35 at the front of the slide 13 and recessing the center thereof as at 36 to provide an annular bearing surface. A complementary flat bearing surface 37 and annular surface 38 are formed on the carriage 14 and the two sets of surfaces cooperate accurately to center and support the swivel carriage in its movements. T bolts 39 operating in an annular slot 40 of the tool slide, and bolts 39ª operating in a T slot in the rack member 41, are provided for clamping the swivel carriage securely in its angularly adjusted position.

The mechanism for effecting angular movement of the swivel carriage comprises a segment gear member 41, which for convenience, may be a separate element and bolted fast to the translatable slide 13 as illustrated in Figs. 2 and 4. A small pinion 42 journalled in the swivel carriage and driven from a worm wheel 43 meshes with the segment gear 41. A worm shaft 44 extending upwardly and forwardly of the swivel carriage, carries at its lower end a worm 45ª in mesh with the worm wheel 43, and at its upper end a clutch element 44ª whereby a detachable crank handle 45 may be applied for manually adjusting the swivel carriage about its axis.

In swinging the carriage from the position shown in full line in Fig. 2, to the dotted line position, a heavy burden is placed on the operator by reason of the fact that substantially the entire weight of the carriage is at one side of the axis of rotation. Moreover, as the position of the carriage varies with each gear angle, the position of the crank handle likewise changes, and frequently occupies positions not conveniently accessible for operation. While the crank mechanism is arranged always to be operable, even at times with great difficulty as, for example, when the cutter is in the opposite position from that shown in dotted lines in Fig. 2, thus placing the crank handle upside down, the task is frequently rendered exceedingly difficult and confusing.

These difficulties have all been overcome by the present invention by the provision of an electively available and easily controlled power indexing mechanism. A preferred form of power drive is illustrated in Figs. 5 and 6 which includes a power take off comprising a worm gear 46 cut on the shaft 39 and a worm gear 47 keyed to the end of a shaft 48 whereby the power take off shaft 48 is made to parallel the worm shaft 44 previously described. Splined to the upper end of the shaft 48 is a sliding clutch gear 49 that is adapted selectively to be meshed with a coacting clutch gear 50. The gear 50 is mounted also at the upper end of the shaft 44 and normally occupies a position in a plane below the gear 49 and fully out of mesh therewith, and the latter gear is prevented from dropping into mesh with the gear 50 by means of an underlying coil spring 51. The spring operates between a shoulder 52 on the shaft 48 and the underside of the gear, and is capable of being compressed manually when it is desired to bring the running gear 49 into engagement with the gear 50. For that purpose a control button 53 overlies the gear and projects through a cover plate 54 so as to be operable from the outside by the operator, and is normally prevented from turning with the gear by the provision of an antifriction bearing 55 interposed between the underside of the button and the outer side of the gear. By this arrangement it has now been made possible conveniently to adjust the carriage slowly but steadily by power merely by pressing the control button 53 and holding it depressed until the carriage has reached the desired angular position. If the operator's attention is distracted and he removes his pressure from the button, the spring 51 automatically throws the power gear 49 out of mesh with the gear 50 and movement of the swivel carriage ceases. And because of the interlock provided between worm gearing 43, 45ª, the carriage is mechanically locked in position. Subsequently, minor adjustment in angularity in the position of the carriage may be effected by actuating the hand crank 45, which will not be difficult, inasmuch as the extent of movement to position the crank precisely at a given position, will not be considerable. A scale 56 on the slide and zero marks 57, 58, on the carriage coact to assist the operator in attaining the desired angular position.

The invention also proposes a further and a still more sensitive method of effecting precision adjustments of the carriage. This further mechanism consists in extending the main driving worm shaft 25 all the way through the cutter slide 13 and providing at its end a micrometer head and crank adapter 59. Applying the crank 45 to the shaft 25, and by holding the control button 53 depressed, the operator may attain extremely fine adjustments in the angular position of the carriage. In making precision adjustments from the point 59 the manual drive is through the reduction gearing 26, 27 in addition to the reduction gearing 43, 45ª, and in consequence thereof exceedingly fine adjustments in angularity of the cutter spindle may be attained.

This adjustment point 59 has the further advantage that it does not revolve in space and is always conveniently accessible. Also, the adjustment point 59 may be availed of in accurately setting the position of the hobbing cutter C, for with the gear 49 spring pressed out of mesh with the gear 50, operation of the cutter drive shaft 25 turns merely the cutter.

It will be understood that all adjustments to be made from the points 59 or 44ª are made when the sliding gear 19ª of the reversing mechanism 19 is in the neutral position, so that there is no power in the main drive or branch trains.

The reversing mechanism 19 is provided in the machine so that downward cuts may be taken with the hob C irrespective whether the cutter carriage is in the left quadrant of the machine or in the right quadrant. When the spindle and carriage is in the position indicated in dotted lines in Fig. 2, it is suitable for cutting left hand helical gears and when swung to the equivalent right hand position, it is suitable for cutting right hand helical gears. If there were no reversing mechanism in the cutter drive, the swing from the left position to the right would effect a change in the direction of cut from a downward cut to an upward cut, and the reverser 19 is provided to enable the down cut to be made when cutting either left or right hand gears.

When, however, the cutter carriage is in either of the last named two positions, and the reversing mechanism 19 shifted to effect the proper direction of cut, and it is desired to propel the carriage by power to the other position, the gearing has been so arranged that the action of pressing the control button 53 starts to elevate the carriage. In other words, when the gearing is arranged to propel the cutter in its proper direction, the cutter carriage is always lifted by the power, as it is the lifting of the weight of the carriage that is the most difficult part of the adjustment to effect. The reversing mechanism 19 is conveniently operated from the operator's side of the machine through a lever 19ᵇ and rack and pinion mechanism 19ᶜ.

A modified form of drive for swiveling the cutter carriage by power is illustrated in Figs. 7, 8, and 9 of the drawings. In this form the worm shaft 44 carries at its upper end a double gear element 70, the upper gear 71 of which, meshes continuously with a wide faced idler gear 72. The lower gear 73 of the gear element 70 is adapted to be meshed by the sliding clutch gear 74 on the power take off shaft 48. The gear 74 when moved to its other extreme position is adapted to mesh with the idler gear 72. A neutral position is provided between the gears 72 and 73 so that either a forward drive through 74—73 or the reverse drive through 74—72—71 may be engaged or disconnected at will. The sliding gear 74 is spring pressed from both extreme positions toward neutral by means of the springs 75 and 76, but may be moved in opposition to either spring by a control handle 77 and its attached shifting fork. The worm shaft 44 projects through the cover 78 and is accessible for operation by the hand crank 45 as previously explained.

With this form of drive the operator may propel the cutter carriage by power in either direction irrespective of the direction of rotation of the cutter, and as explained in connection with the form of drive shown in Fig. 5, if the operator releases his grip on the control handle 77, the power driven gear 74 automatically shifts to neutral and stops the angular motion of the carriage. In other respects the construction and mountings of this form of drive, including the cutter reversing mechanism 19 and the fine and superfine precision adjustments effected by manually operating the shaft 44 and the main shaft 25 respectively is similar to the form previously discussed and need not be explained in detail.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. A power index for a cutter carriage of a hobbing machine having a tool slide, a swivable cutter carriage pivoted thereto, a cutter spindle journaled in the swivel carriage and power means for rotating the cutter spindle; the combination of a segment gear and single pinion mechanism between said swivel carriage and said slide adapted when operated to effect relative movement of said members about said pivot, a branch power train operating off of said spindle rotating power means, and selectively operable connections between said segment gear and pinion mechanism and said operating branch power train for actuating the segment gear and pinion mechanism and thereby effect said relative movement by power.

2. The combination set forth in claim 1 in which the selectively operable connections between the segment gear and pinion mechanism and the branch power train includes a sliding gear element and manually operable means to shift said gear into mesh with a cooperating gear of the train to effect power indexing movements of said swivel carriage; and means automatically operable on the release of said manual means to disengage said sliding gear from its coacting gear.

3. A power transmission for a cutter carriage of a hobbing machine having a supporting slide; a swivable cutter carriage pivoted thereto, a cutter spindle journaled in the swivel carriage, combining power means for rotating the cutter spindle and for moving the carriage about its pivot comprising, a main power drive train to said spindle, a segment gear and pinion mechanism between said carriage and said slide, a branch transmission connecting said segment gear and pinion mechanism with the said main transmission adapted when rendered effective to operate the said mechanism and thereby to propel said carriage about its pivot, and reversing means selectively operable to effect power propulsion of the carriage in either direction of angular movement on its supporting slide.

4. In combination with the power means for operating a spindle of a swivel cutter carriage of a hobbing machine, a segment gear and pinion mechanism adapted when operated to effect angular movement of said carriage about its pivot, a worm and worm wheel power take off transmission branching from the spindle power means for actuating the segment gear and pinion mechanism; and manually operable means in said branching transmission for rendering the said power actuating means effective at will.

5. A power means for adjusting a swivel cutter carriage of a hobbing machine angularly about its pivot, combining a main power drive for the cutter spindle of said carriage, a segment gear and pinion mechanism operable to effect angular movement of the carriage about its pivot, a branch transmission including a worm and worm gear power take off and a sliding gear for establishing a power drive between said main transmission and said segment gear and pinion mechanism, and manual means in the branch transmission between the rack and pinion mechanism and the sliding gear for effecting precision adjustments by hand.

6. A power means for adjusting a swivel cutter carriage of a hobbing machine angularly about its pivot, combining a main power drive for the cutter spindle of said carriage, a first manual means mounted on the swivel carriage operable to effect angular movement of the carriage about its pivot, a worm and worm wheel branch transmission including a clutch for establishing a power drive between said main power drive and said first manual means, and a second manual means located in the said main power drive ahead of the said clutch for effecting precision adjustments by hand when said first named manual means is in an angular position rendering manual operation thereof difficult.

7. A hobbing machine combining a cutter slide, a cutter spindle carriage pivotally supported thereon, a first manually operable means for effecting precision adjustments of the carriage on said slide, power means for operating the cutter spindle and electively operative connections therefrom to said manually operable means whereby also to effect major adjustments in angular movement of the carriage at will, and a second manual means operable at a point in the cutter spindle power train at the power side of said electively operable connections for effecting still finer precision adjustments by hand.

8. A hobbing machine combining a cutter slide, a cutter spindle carriage pivotally supported thereon, means for effecting adjustments of the carriage on said slide, power means for operating the cutter spindle, and electively operative connections from said power means to said carriage adjusting means, comprising a sliding gear, an idler gear, and a driven gear element continuously in mesh with the idler gear, and means for positioning said sliding gear selectively in mesh with either the idler gear or with said driven gear element thereby to effect adjustment of said carriage by power selectively in either direction.

9. A hobbing machine having a slide member, a cutter carriage pivotally supported thereon, a cutter spindle journaled in the carriage, and power means for operating said cutter spindle, the combination of power means adapted when operated to effect angular movement of said carriage about its pivot, said last named power means including a shiftable control element, manually operable means for shifting said control element to an effective position thereby to render the said power means operative to adjust said carriage angularly, and means automatically effective upon the release of said manual means by the operator to render the power means ineffective to further adjust said carriage.

WILLIAM F. ZIMMERMANN.